United States Patent
Yoshida et al.

(10) Patent No.: US 8,232,353 B2
(45) Date of Patent: Jul. 31, 2012

(54) PROCESSES FOR PRODUCING NANO-SPACE CONTROLLED POLYMER ION-EXCHANGE MEMBRANES

(75) Inventors: Masaru Yoshida, Gunma-ken (JP); Tetsuya Yamaki, Gunma-ken (JP); Masaharu Asano, Gunma-ken (JP); Yosuke Morita, Gunma-ken (JP)

(73) Assignee: Japan Atomic Energy Research Institute, Kashiwa-Shi (JP)

( * ) Notice: Subject to any disclaimer, the term of this patent is extended or adjusted under 35 U.S.C. 154(b) by 999 days.

(21) Appl. No.: 11/892,304

(22) Filed: Aug. 21, 2007

(65) Prior Publication Data

US 2008/0033069 A1    Feb. 7, 2008

Related U.S. Application Data

(62) Division of application No. 10/912,286, filed on Aug. 6, 2004, now Pat. No. 7,276,561.

(30) Foreign Application Priority Data

Aug. 28, 2003 (JP) .................. 2003-305089
Aug. 28, 2003 (JP) .................. 2003-305094

(51) Int. Cl.
*C08F 2/46* (2006.01)

(52) U.S. Cl. ..... 525/276; 525/243; 525/246; 525/326.2; 522/85; 522/106; 526/243

(58) Field of Classification Search .................. 525/276, 525/243, 246, 326.2; 526/243; 522/85, 106
See application file for complete search history.

(56) References Cited

U.S. PATENT DOCUMENTS

| | | | |
|---|---|---|---|
| 3,692,569 A | 9/1972 | Grot | 428/319.7 |
| 4,396,727 A * | 8/1983 | Ishigaki et al. | 521/27 |
| 5,039,389 A * | 8/1991 | McMichael | 204/282 |
| 6,710,098 B1 * | 3/2004 | Lee et al. | 522/161 |
| 6,773,654 B2 * | 8/2004 | Sugo et al. | 264/485 |
| 6,828,386 B2 | 12/2004 | MacKinnon | 525/276 |
| 7,087,269 B2 * | 8/2006 | Lee et al. | 427/532 |
| 2004/0009305 A1 | 1/2004 | Stone et al. | 427/551 |
| 2004/0249013 A1 * | 12/2004 | Tilquin | 522/113 |

FOREIGN PATENT DOCUMENTS

JP    2001-348439    * 12/2001

OTHER PUBLICATIONS

May 21, 2007 Notice of Allowance in U.S. Appl. No. 10/912,286.
Nov. 28, 2006 Office Action in U.S. Appl. No. 10/912,286.
Aug. 30, 2006 Office Action in U.S. Appl. No. 10/912,286.
U.S. Appl. No. 12/662,160, Apr. 1, 2010, Jinhua Chen et al., Japan Atomic Energy Agency.
U.S. Appl. No. 10/912,286, Aug. 6, 2004, Jinhua Chen et al., Japan Atomic Energy Agency.
Patent Abstracts of Japan, Publication No. 2001-348439, published Dec. 18, 2001, discussed in specification in paragraph 11.
U.S. Appl. No. 10/912,286, Aug. 6, 2004, Masaru Yoshida et al., Japan Atomic Energy Research Institute.
Takahashi et al., "Gas-Permeation Control by PET Membranes with Nanosized Pores", Polymer Journal, vol. 36, No. 1, pp. 50-53 (2004).
Takahashi et al., "Role of a Bulky Hydrophobic Pendant in a Hydrophilic Copolymer and the Effect of Heavy Ion Irradiation on this Copolymer", Journal of Membrane Science 206, pp. 165-177 (2002).
Apel et al., "Diode-Like Single-Ion Track Membrane Prepared by Electro-Stopping", Nuclear Instruments and Methods in Physics Research B, pp. 337-346 (2001).
Yoshida et al., "Novel Thin Film with Cylindrical Nanopores That Open and Close Depending on Temperature: First Successful Synthesis", Macromolecules, vol. 29, pp. 8987-8989 (1996).

* cited by examiner

*Primary Examiner* — Henry Hu
(74) *Attorney, Agent, or Firm* — Staas & Halsey LLP

(57) ABSTRACT

A polymer film substrate is irradiated with ions to make a large number of nano-sized through-holes and the substrate may be further irradiated with ionizing radiation so that a functional monomer may be grafted or co-grafted onto a surface of the film and within the holes; in addition, sulfonic acid group(s) may be introduced into the graft chains to produce a polymer ion-exchange membrane that may have high oxidation resistance, dimensional stability, electrical conductivity and/or methanol resistance, as well as may have an ion-exchange capacity controlled over a wide range.

10 Claims, No Drawings

PROCESSES FOR PRODUCING NANO-SPACE CONTROLLED POLYMER ION-EXCHANGE MEMBRANES

CROSS-REFERENCE TO RELATED APPLICATIONS

This application is a divisional of application Ser. No. 10/912,286, filed Aug. 6, 2004, now U.S. Pat. No. 7,276,561, the entire contents of which are incorporated herein by reference. This application is based upon and claims the priority of Japanese Application Nos. 2003-305089 and 2003-305094 filed Aug. 28, 2003, the entire contents of which are incorporated herein by reference.

BACKGROUND OF THE INVENTION

This invention relates to a process for producing polymer ion-exchange membranes which are solid polymer electrolyte membranes suitable for use in fuel cells.

The invention also relates to a process for producing polymer ion-exchange membranes that are solid polymer electrolyte membranes suitable for use in fuel cells and which have not only high oxidation and heat resistance as well as high dimensional stability but also high electrical conductivity while permitting the ion exchange capacity to be controlled over a wide range.

Fuel cells that employ solid polymer electrolyte ion-exchange membranes have high energy density and hence hold promise for use as power supplies to electric vehicles or as simplified auxiliary power sources. For fuel cells, the development of polymer membranes having satisfactory characteristics is one of the most important steps to take.

In polymer ion-exchange membrane fuel cells, the ion-exchange membrane not only acts as a proton conducting electrolyte but also has the role of a diaphragm that prevents the fuel hydrogen or methanol from directly mixing with the oxidant air (oxygen). Working as the electrolyte, the ion-exchange membrane must satisfy the following requirements: large ion-exchange capacity; high enough chemical stability to withstand prolonged current impression, in particular, high resistance (oxidation resistance) against hydroxyl radicals, etc. that are a major cause of membrane deterioration; heat resistance to at least 80° C. which is the cell operating temperature; and consistently high enough water-retaining ability of the membrane to keep low levels of electrical resistance. The membrane which also has the role of a diaphragm must satisfy other requirements including high mechanical strength and good dimensional stability, as well as the absence of excessive permeability to hydrogen gas, methanol and oxygen gas.

Early polymer ion-exchange membrane fuel cells employed hydrocarbon-based polymer ion-exchange membranes as produced by copolymerizing styrene with divinylbenzene. However, those ion-exchange membranes did not have high practical feasibility since they were very low in durability on account of poor oxidation resistance; hence, they were later replaced by Nafion$^{RT}$ and other fluorine-containing polymer ion-exchange membranes. Nafion$^{RT}$ is the fluorinated sulfonic acid polymer membrane developed by Du Pont.

The conventional fluorine-containing polymer ion-exchange membranes including Nafion$^{RT}$ are satisfactory in terms of chemical durability and stability; on the other hand, their ion-exchange capacity is small, only about 1 meq/g, and on account of insufficient water retention, the ion-exchange membrane dries and its proton conductivity is lowered, or in the case where methanol is used as fuel, the membrane will swell or "cross-over" of methanol or hydrogen gas will occur.

If, with a view to increasing the ion-exchange capacity, an attempt is made to introduce more sulfonic acid groups, the membrane, having no crosslinked structure in the polymer chains, swells and its strength decreases so markedly that it may break easily. Therefore, with the conventional fluorine-containing polymer ion-exchange membranes, it has been necessary to reduce the amount of sulfonic acid groups to levels that can retain the membrane strength and the only products that could be obtained had no greater ion-exchange capacity than about 1 meq/g.

Other problems with Nafion$^{RT}$ and other conventional fluorine-containing polymer ion-exchange membranes are that monomer synthesis is difficult and complicated and that the process of polymerizing the monomers to produce a polymer membrane is also complicated; the resulting prohibitive price of the product membrane has been a great obstacle to the effort in commercialization by installing the proton-exchange membrane fuel cell on vehicles, etc. Under the circumstances, massive efforts have been made to develop low-cost yet high-performance electrolyte membranes that can be substituted for Nafion$^{RT}$ and other conventional fluorine-containing polymer ion-exchange membranes.

In radiation-induced graft polymerization which is closely related to the present invention, attempts have been made to prepare solid polymer electrolyte membranes by grafting monomers that can introduce sulfonic acid groups into polymer membranes. The present inventors made intensive studies in order to develop such new solid polymer electrolyte membranes and by first introducing a styrene monomer into a poly(tetrafluoroethylene) film having a crosslinked structure through radiation-induced graft reaction and then sulfonating the introduced grafts, they invented a solid polymer electrolyte membrane characterized by ion-exchange capacity that was high and could be controlled over a wide range. The membrane and the process for its production were applied for patent (JP 2001-348439 A). However, since the styrene graft chains in this ion-exchange membrane were composed of hydrocarbons, prolonged application of an electric current to the membrane caused oxidation in part of the graft chains, resulting in a lower ion-exchange capacity of the membrane.

The present inventors continued their study and by first performing radiation-induced grafting of a fluorine-containing monomer or co-grafting of fluorine-containing monomers to a poly(tetrafluoroethylene) film having a crosslinked structure and then introducing sulfone groups into the graft chains, they invented a solid polymer electrolyte membrane characterized by a broader range of high ion-exchange capacity and satisfactory oxidation resistance. The membrane and the process for its production were applied for patent (JP 2002-348389 A). However, as it turned out with the ordinary fluorinated polymer membranes, the graft reaction of the fluorine-containing monomer or monomers did not progress efficiently to the inside of the membrane and depending on the reaction conditions, the graft reaction was only limited to the surface of the film and it was difficult to produce an electrolyte membrane having improved characteristics.

SUMMARY OF THE INVENTION

The present invention has been accomplished under these circumstances and has as an object providing improved polymer ion-exchange membranes that are free from the aforementioned problems of the prior art solid electrolyte polymers, namely, small ion-exchange capacity, poor dimensional stability of the membrane, low oxidation resistance, and low operating temperature (i.e., low heat resistance).

Another object of the invention is to prevent the cross-over of the fuel methanol or hydrogen gas.

Thus, the present invention provides polymer ion-exchange membranes having a broad range of high ion-exchange capacity, as well as satisfactory oxidation resistance, electrical conductivity and dimensional stability.

The present invention also provides a process for producing such polymer ion-exchange membranes.

More specifically, the invention provides polymer ion-exchange membranes having the above-described features and which are suited to use in fuel cells.

The invention further provides a process for producing such particular membranes.

The present inventors carried on the study of irradiating polymer films, grafting or co-grafting a variety of monomers and introducing sulfonic acid groups into the obtained graft chains. As a result, they successfully invented a process for producing polymer ion-exchange membranes which comprised irradiating the substrate polymer film with high-energy heavy ions to form a large number of fine cylindrical through-holes varying from nano to micron size in diameter, grafting a specified functional monomer to the inner surfaces of the holes as initiated by an ionizing radiation, with care being taken to ensure that the grafting would progress to the central part of the membrane, and thereafter converting the introduced sulfonyl, ester, halide and other functional groups to sulfonic acid groups.

The present inventors further carried on the study of irradiating polymer films, grafting or co-grafting a variety of monomers and introducing sulfonic acid groups into the obtained graft chains. As a result, they successfully invented a process for producing polymer ion-exchange membranes which comprised irradiating the substrate polymer film with hydrogen ions, helium ions or high-energy heavy ions to form a large number of irradiation-damaged regions of nano size, grafting a specified functional monomer to the damaged regions, and then converting the halide or ester groups in the grafted molecular chains to sulfonic acid groups.

The polymer ion-exchange membranes of the invention are characterized by 10-150% monomer grafting to the polymer film and an ion-exchange capacity of 0.3-2.5 meq/g. The polymer ion-exchange membranes of the invention have outstanding features such as the ability of various characteristics including ion-exchange capacity to be controlled over an appropriate and broad range, high oxidation resistance, heat resistance and electrical conductivity, and high dimensional stability of the membrane.

The polymer ion-exchange membranes produced by the processes of the invention are characterized by high oxidation resistance, electrical conductivity, dimensional stability and methanol resistance, as well as the controllability of ion-exchange capacity over a broad range.

The ion-exchange membranes of the invention having these features are particularly suited to use in fuel cells. They are also useful as electrolytic membranes and ion-exchange membranes that are inexpensive and durable.

DETAILED DESCRIPTION OF THE EMBODIMENTS

In one embodiment of the invention, poly(vinylidene fluoride) (hereunder abbreviated as PVDF) having high heat resistance and oxidation resistance is used as a polymer film substrate. Polymer films having a crosslinked structure may also be used as the substrate and the crosslinked structure in the polymer backbone contributes to improving the membrane's heat resistance and the degree of monomer grafting, as well as preventing the drop in membrane strength due to irradiation. The polymer film substrate having a crosslinked structure is particularly suitable for the purpose of fabricating fuel cell membranes that operate at elevated temperatures and exhibit high performance.

The film substrate is irradiated with high-energy heavy ions by a suitable means such as a cyclotron accelerator. The heavy ions as used herein refer to ions heavier than the carbon ion. If irradiation is effected with ions of smaller mass than the carbon ion, the pores formed by the subsequent hole making process have low depth-to-diameter ratio and small and deep enough holes are difficult to make in the polymer film substrate that. While a variety of heavy ions can be employed, forming fine through-holes of a nano to micron size range in the polymer film requires that the region damaged by irradiation with a single ion ranges from a few nanometers to several hundred nanometers [H. Kudoh and Y. Morita, J. Poly. Sci., Part B. Vol. 39, 757 (2001)]. The size of an irradiation damaged region depends on the mass and energy of ions that are applied. Speaking further of the kinds of heavy ions that can be used in irradiation, carbon, nitrogen, oxygen, neon, argon, krypton, xenon, etc. can easily generate ions and, hence, are useful as irradiating ion species. In order to ensure that a single ion can damage a larger region by irradiation, ions of large mass such as the gold ion, bismuth ion or uranium ion may be employed. The ion to be applied may have any value of energy that is sufficient to penetrate the thickness of the polymer film substrate. To give guide figures for a PVDF film substrate having a thickness of 50 μm, the carbon ion should have an energy of at least 40 MeV, the neon ion at least 80 MeV, and the argon ion at least 180 MeV; for a substrate thickness of 100 μm, the carbon ion should have an energy of at least 62 MeV, the neon ion at least 130 MeV, and the argon ion at least 300 MeV. The xenon ion can penetrate a 400 μm thick polymer film substrate if it has an energy of 450 MeV, and the uranium ion can penetrate a thickness of 200 μm if it has an energy of 2.6 GeV.

In the next step, the ion-irradiated film is treated with a 0.1 N-10 N solution of KOH or NaOH (in water or a mixture of water with an alcohol such as methanol, ethanol, n- or i-propanol or t-butanol) at between room temperature and 80° C., whereby fine cylindrical through-holes are made centering on the ion-irradiation damaged region (JP 5-51479 A and JP 6-7656). In the case of a fluorinated film substrate, holes can be made by heating it to temperatures of 100° C. and above since by so doing, the irradiation-damaged areas of the substrate are decomposed into monomeric or monomer-like gases. The average diameter of the holes in a surface of the film substrate can be easily measured with a scanning electron microscope.

The average diameter of the holes in the film substrate to be used in the invention is preferably at least 10 nm but not more than 10 μm as measured on the film surface; if an ion-exchange membrane is to be produced from the substrate, the more preferred range is from 10 nm to 1 μm. Through-holes smaller than 10 nm are difficult to make by etching whereas holes larger than 10 μm will lower the strength of the film substrate. The number of holes in the substrate surface is proportional to the dose of ion irradiation and ranges preferably from $10^4$ to $10^{14}$ per square centimeter. If the number of holes is less than $10^4$ per square centimeter, the ion-exchange membrane prepared by the grafting and sulfonation procedures to be described below will not have the desired electrical conductivity and other characteristics. If the number of holes exceeds $10^{14}$ per square centimeter, the overlapping of holes contributes to a smaller number of closed holes and hence lowers the membrane characteristics.

A polymer ion-exchange membrane according to one embodiment of the present invention can be produced by the following procedure: to the perforated PVDF film substrate, the monomer solution or the monomer/comonomer mixed solution that are described below is added and, after evacuation and degassing, the substrate is exposed to an ionizing radiation such as γ-rays, high-energy electron beams or X-rays to generate active points for grafting on a surface of the film substrate or on the inner surfaces of the holes in the substrate, where simultaneous graft polymerization of the monomer is effected and the sulfonyl halide groups [—$SO_2X^1$], sulfonic acid ester groups [—$SO_3R^1$] or halide groups [—$X^2$] in the graft molecular chains are converted to sulfonic acid groups [—$SO_3H$]. In the case of hydrocarbon-based monomers containing phenyl groups, ketones, ether groups, etc., sulfonic acid groups may be introduced by treatment with chlorosulfonic acid. Simultaneous graft polymerization is a method of performing graft polymerization by applying an ionizing radiation to the film substrate in the co-presence of the monomer.

The monomer which is to be grafted to the polymer film substrate in the present invention may be chosen from the monomers or monomer/comonomer systems listed below under (1)-(10) (hereinafter, the "monomer" shall mean a monomer unit into which sulfonic acid groups can be introduced after grafting and the "comonomer" shall mean a comonomer unit into which sulfonic acid groups cannot be easily introduced after grafting).

(1) at least one monomer selected from group A, or the group consisting of monomers having a sulfonyl halide group, i.e., $CF_2=CF(SO_2X^1)$ (where $X^1$ is the halide group —F or —Cl, as applicable hereinafter), $CH_2=CF(SO_2X^1)$, $CF_2=CF(O(CF_2)_{1-4}SO_2X^1)$ and $CF_2=CF(OCH_2(CF_2)_{1-4}SO_2X^1)$;

(2) at least one monomer selected from group B, or the group consisting of monomers having a sulfonic acid ester group, i.e., $CF_2=CF(SO_3R^1)$ (where $R^1$ is the alkyl group —$CH_3$, —$C_2H_5$ or —$C(CH_3)_3$, as applicable hereinafter), $CH_2=CF(SO_3R^1)$, $CF_2=CF(O(CF_2)_{1-4}SO_3R^1)$ and $CF_2=CF(OCH_2(CF_2)_{1-4}SO_3R^1)$.

(3) at least one monomer selected from group C, or the group consisting of $CF_2=CF(O(CF_2)_{1-4}X^2)$ (where $X^2$ is the halide group —Br or —Cl, as applicable hereinafter) and $CF_2=CF(OCH_2(CF_2)_{1-4}X^2)$;

(4) two or more monomers selected from at least two of the following groups A-C:
group A consisting of $CF_2=CF(SO_2X^1)$ (where $X^1$ is the halide group —F or —Cl, as applicable hereinafter), $CH_2=CF(SO_2X^1)$, $CF_2=CF(O(CF_2)_{1-4}SO_2X^1)$ and $CF_2=CF(OCH_2(CF_2)_{1-4}SO_2X^1)$;
group B consisting of $CF_2=CF(SO_3R^1)$ (where $R^1$ is the alkyl group —$CH_3$, —$C_2H_5$ or —$C(CH_3)_3$, as applicable hereinafter), $CH_2=CF(SO_3R^1)$, $CF_2=CF(O(CF_2)_{1-4}SO_3R^1)$ and $CF_2=CF(OCH_2(CF_2)_{1-4}SO_3R^1)$; and
group C consisting of $CF_2=CF(O(CF_2)_{1-4}X^2)$ (where $X^2$ is the halide group —Br or —Cl, as applicable hereinafter) and $CF_2=CF(OCH_2(CF_2)_{1-4}X^2)$;

(5) a monomer/comonomer system comprising at least one monomer selected from group A consisting of $CF_2=CF(SO_2X^1)$ (where $X^1$ is the halide group —F or —Cl, as applicable hereinafter), $CH_2=CF(SO_2X^1)$, $CF_2=CF(O(CF_2)_{1-4}SO_2X^1)$ and $CF_2=CF(OCH_2(CF_2)_{1-4}SO_2X^1)$, to which at least one comonomer selected from the group consisting of the acrylic monomers $CF_2=CR^2(COOR^3)$ (where $R^2$ is —$CH_3$ or —F, and $R^3$ is —H, —$CH^3$, —$C_2H_5$ or —$C(CH_3)_3$, as applicable hereinafter) and $CH_2=CR^2(COOR^3)$ is added in an amount no more than 50 mol % of the total monomer content;

(6) a monomer/comonomer system comprising at least one monomer selected from group B consisting of $CF_2=CF(SO_3R^1)$ (where $R^1$ is the alkyl group —$CH_3$, —$C_2H_5$ or —$C(CH_3)_3$, as applicable hereinafter), $CH_2=CF(SO_3R^1)$, $CF_2=CF(O(CF_2)_{1-4}SO_3R^1)$ and $CF_2=CF(OCH_2(CF_2)_{1-4}SO_3R^1)$, to which at least one comonomer selected from the group consisting of the acrylic monomers $CF_2=CR^2(COOR^3)$ (where $R^2$ is —$CH_3$ or —F, and $R^3$ is —H, —$CH^3$, —$C_2H_5$ or —$C(CH_3)_3$, as applicable hereinafter) and $CH_2=CR^2(COOR^3)$ is added in an amount no more than 50 mol % of the total monomer content;

(7) a monomer/comonomer system comprising at least one monomer selected from group C consisting of $CF_2=CF(O(CF_2)_{1-4}X^2)$ (where $X^2$ is the halide group —Br or —Cl, as applicable hereinafter) and $CF_2=CF(OCH_2(CF_2)_{1-4}X^2)$, to which at least one comonomer selected from the group consisting of the acrylic monomers $CF_2=CR^2(COOR^3)$ (where $R^2$ is —$CH_3$ or —F, and $R^3$ is —H, —$CH^3$, —$C_2H_5$ or —$C(CH_3)_3$, as applicable hereinafter) and $CH_2=CR^2(COOR^3)$ is added in an amount no more than 50 mol % of the total monomer content;

(8) at least one monomer selected from group D, or the group consisting of styrene, α-methylstyrene and the styrene derivative monomers 2,4-dimethylstyrene, vinyltoluene and 4-tert-butylstyrene;

(9) at least one monomer selected from group E, or the group consisting of acenaphthylene, indene, the vinylketone $CH_2=CH(COR^4)$ (where $R^4$ is —$CH_3$, —$C_2H_5$ or the phenyl group (—$C_6H_5$)), the vinylether $CH_2=CH(OR^5)$ (where $R^5$ is —$C_nH_{2n+1}$ (n=1~5), —$CH(CH_3)_2$, —$C(CH_3)_3$ or a phenyl group) and the fluorinated vinyl ether $CF_2=CF(OR^5)$ or $CH_2=CF(OR^5)$;

(10) a monomer/comonomer system comprising at least two monomers selected from the following groups D-F:
group D consisting of styrene, α-methylstyrene and the styrene derivative monomers 2,4-dimethylstyrene, vinyltoluene and 4-tert-butylstyrene;
group E consisting of acenaphthylene, indene, the vinylketone $CH_2=CH(COR^4)$ (where $R^4$ is —$CH_3$, —$C_2H_5$ or the phenyl group (—$C_6H_5$)), the vinylether $CH_2=CH(OR^5)$ (where $R^5$ is —$C_nH_{2n+1}$ (n=1~5), —$CH(CH_3)_2$, —$C(CH_3)_3$ or a phenyl group) and the fluorinated vinyl ether $CF_2=CF(OR^5)$ or $CH_2=CF(OR^5)$; and
group F consisting of $CF_2=CR^2(COOR^3)$ (where $R^2$ is —$CH_3$ or —F, and $R^3$ is —H, —$CH^3$, —$C_2H_5$ or —$C(CH_3)_3$, as applicable hereinafter) and $CH_2=CR^2(COOR^3)$.

The acrylic monomers mentioned under (5)-(7) and (10) may be exemplified by $CF_2=CF(COOCH_3)$, $CF_2=C(CH_3)(COOCH_3)$, $CH_2=C(CH_3)(COOH)$, $CH_2=CF(COOCH_3)$, $CH_2=CF(COOC(CH_3)_3)$, etc. These comonomers are such that after grafting, sulfonic acid groups cannot be introduced into their units, so they are preferably mixed as comonomers in amounts that do not exceed 50 mol % of the total monomer content.

In homograft polymerization using the monomers mentioned under (1)-(3), the intended graft polymerization proceeds fully to a surface of the film substrate and to the inner surfaces of the holes in it; on the other hand, in co-graft polymerization using the comonomers mentioned under (4)-(7), the grafting rate is markedly increased as compared to homo-grafting. Take, for example, $CF_2=F(O(CF_2)_{1-4}SO_2X^1)$, $CF_2=CF(O(CF_2)_{1-4}SO_3R^1)$ and $CF_2=CF(O(CF_2)_{1-4}X^2)$; these monomers do not polymerize well by themselves but they are reasonably useful when co-grafted with comonomers.

As will be described later, using the monomers mentioned under (8)-(10), one can introduce effective amounts of sulfonic acid groups into graft chains by sulfonation with chlorosulfonic acid and the like.

The monomers and monomer/comonomer systems mentioned under (1)-(10) may be diluted with solvents before use and exemplary solvents include Freon 112 ($CCl_2FCCl_2F$), Freon 113 ($CCl_2FCClF_2$), dichloroethane, chloromethane, n-hexane, alcohol, t-butanol, benzene, toluene, cyclohexane, cyclohexanone and dimethyl sulfoxide.

If desired, the above-mentioned monomer systems may be grafted in the presence of at least one crosslinking agent selected from the group consisting of divinylbenzene, bis (vinylphenyl)ethane, triallyl cyanurate, triallyl isocyanurate, 3,5-bis(trifluorovinyl)phenol and 3,5-bis(trifluorovinyloxy) phenol, as it is added in an amount no greater than 30 mol % of the total monomer content.

The above-mentioned monomers are grafted to the ion-perforated film substrate by the following procedure: the perforated film substrate is placed in a stainless steel or glass pressure vessel; after fully evacuating the vessel, a monomer or monomers which have been preliminarily freed of oxygen gas by bubbling with an inert gas or freeze-degassing are added to the substrate, which is then irradiated with 5-500 kGy of γ-rays from $^{60}Co$ at room temperature in an inert gas. Grafting can be effected by either one of two methods, simultaneous irradiation in which the perforated film substrate and the monomer are irradiated simultaneously to perform graft reaction, and post-graft polymerization in which the perforated film substrate is first irradiated and then brought into contact with the monomer to perform graft reaction. The temperature for graft polymerization is at room temperature in simultaneous irradiation whereas it is not higher than the boiling point of the monomer or solvent in post-graft polymerization, which is typically performed in the range of 0° C.-100° C. Since the presence of oxygen interferes with the graft reaction, the aforementioned series of operations are performed in an inert gas such as argon gas or nitrogen gas and the monomer or the solution having it dissolved in a solvent are used as freed of oxygen by the usual treatment (i.e., bubbling or freeze-degassing).

Preferred examples of the ionizing radiation include γ-rays and X-rays having high penetrating power, as well as electron beams of sufficiently high energy to penetrate the irradiation vessel, the film substrate and the monomer solution.

The method of making holes by ion irradiation is applicable to a wide range of organic polymer materials irrespective of the constituent molecules in the polymer and its solid-state structure, i.e., whether it is crystalline or amorphous. In one embodiment of the invention, the polymer film substrate is made of poly(vinylidene fluoride) (PVDF). Others that can be employed include high-molecular weight polyethylene, polypropylene, polystyrene, polyamide, aromatic polyamide, polyethylene terephthalate, polyethylene naphthalate, polycarbonate, polyetherketone, polyetheretherketone, polyethersulfone, poly(phenylene sulfide) and polysulfone film substrates. One may also use polyimide-based polymer films, such as polyimide, polyetherimide, polyamideimide, poly- benzimidazole and polyetheretherimide film substrates. Further examples that can be used are film substrates made of fluorinated polymers such as an ethylene-tetrafluoroethylene copolymer, polytetrafluoroethylene, a tetrafluoroethylene-propylene hexafluoride copolymer and a tetrafluoroethylene-per(fluoroalkyl)vinyl ether copolymer. These film substrates may or may not have a crosslinked structure. By using a preliminarily crosslinked film substrate, various advantages will result, such as improved heat resistance of the ion-exchange membrane obtained, less swelling of the membrane, improved degree of monomer grafting due to the introduced crosslinked structure, and the prevention of a drop in membrane strength in spite of ion irradiation. Hence, the crosslinked film substrate is suitable for use in fuel cells that operate at high temperature and exhibit high performance. Consider, for example, the case of using styrene as a monomer to be grafted onto polytetrafluoroethylene; compared to an uncrosslinked polytetrafluoroethylene, a crosslinked polytetrafluoroethylene allows for a marked increase in the degree of grafting and the present inventors already found that 2 to 10 times as many sulfonic acid groups could be introduced into the crosslinked polytetrafluoroethylene as into the uncrosslinked polytetrafluoroethylene (JP 2001-348439 A corresponding to Japanese Patent Application 2000-170450). For the methods of producing a tetrafluoroethylene-propylene hexafluoride copolymer and a tetrafluoroethylene-per (fluoroalkyl)vinyl ether copolymer that have a crosslinked structure, see Radiation Physical Chemistry, Vol. 42, No. 1/3, pp. 139-142 (1993).

After grafting the monomer to the perforated film in the manner described above, sulfonic acid groups can be introduced by the following procedure: speaking of the monomers mentioned under (1)-(7), the [—$SO_2X^1$] groups in the grafted molecular chains are converted to the sulfonate [—$SO_3M$] groups (where M is the alkali metal Na or K) by reaction in a 0.1 N-10 N solution of potassium hydroxide (KOH) or sodium hydroxide (NaOH) in water, a water/alcohol mixture or a water/dimethyl sulfoxide mixture at between room temperature and 100° C. and the sulfonate groups are then converted to the sulfonic acid group [—$SO_3H$] in 1 N-2 N aqueous sulfuric acid at 60° C., thereby producing the desired polymer ion-exchange membrane; the [—$SO_3R^1$] groups in the grafted molecular chains are converted to the sulfonic acid group [—$SO_3H$] either by reaction in an acidic solution such as 0.1 N-10 N aqueous sulfuric acid at between room temperature and 100° C. to effect hydrolysis or by performing hydrolysis in aqueous potassium hydroxide or sodium hydroxide of the same concentration, whereby the desired polymer ion-exchange membrane is obtained; the halide group [—$X^2$] in the grafted molecular chains is converted to the sulfonate group [—$SO_3M$] (where M is the alkali metal Na or K) by reaction in a solution of a sulfite or a hydrogensulfite in water or a water/alcohol mixture, and the sulfonate group is then converted to the sulfonic acid group [—$SO_3H$] by the same method as described above.

Speaking of the monomers mentioned under (8)-(10), the grafted molecular chains or the phenyl groups, ketones or ether groups in the grafted molecular chains are subjected to reaction with a solution of chlorosulfonic acid in dichloroethane or chloroform so that the sulfonic acid group is introduced into the graft chains. As for the ketones and ether groups, the sulfonic acid group is introduced into the graft chains by dehydrochlorination on these groups and/or the surrounding structure. In the case of film substrates based on hydrocarbons having an aromatic ring, the introduction of sulfonic acid groups by treatment with chlorosulfonic acid also causes sulfonation of the substrate itself, so the use of film substrates having a crosslinked structure is particularly effective.

Speaking further of the monomers mentioned under (5)-(7), the ester groups in the graft chains obtained therefrom can also be converted to the carboxyl group by reaction with a solution of sodium hydroxide (NaOH) or potassium hydroxide (KOH). The carboxyl group is extremely useful for the purpose of maintaining the water content of the film in the case where the ion-exchange membrane obtained by the invention is used in fuel cells.

Aside from these methods involving graft reaction, polymer film substrates made of poly(vinylidene fluoride), an ethylene-tetrafluoroethylene copolymer, a super-high-molecular weight polyethylene, polypropylene, polystyrene and polyamide, having or not having a crosslinked structure, may be subjected to perforation by irradiation with high-energy heavy ions and thereafter reacted with chlorosulfonic acid so that the sulfonic acid group [—$SO_3H$] is directly introduced into the molecular chains in the film substrate, thereby producing the desired polymer ion-exchange membrane. The rationale of this approach is as follows: the above-described polymer film substrate has the —$CH_2$—$CH_2$— unit or the $CH_2$—$CF_2$— unit in the molecule and, upon irradiation with heavy ions, a lot of hydrogen atoms as attached to double bonds or tertiary carbons are generated in the irradiation-damaged regions of the film; many of such hydrogen atoms as attached to double bonds or tertiary carbons also remain on the inner surfaces of the perforations and react with chlorosulfonic acid to get high concentrations of sulfonic acid groups to be fixed on those inner surfaces, thereby yielding a polymer ion-exchange membrane that shows the ion-exchanging capability.

In yet another embodiment of the invention, a polyethylene terephthalate film substrate is used as the polymer film substrate.

This substrate is irradiated with hydrogen ions, helium ions or high-energy heavy ions using a suitable apparatus such as a cyclotron accelerator.

The number of ions to be applied is preferably determined within the range of from $10^4$ to $10^{14}$ per square centimeter so that the region damaged by irradiation with one ion will not overlap the region damaged by irradiation with another ion. Ion irradiation is preferably performed as follows: the film substrate typically measuring 10 cm×10 cm is fixed on the irradiation pad in an irradiation chamber connected to a cyclotron accelerator or the like; with the interior of the irradiation chamber evacuated to $10^{-6}$ Torr or below, the substrate is irradiated with high-energy ions as they are scanned. The dose of irradiation can be determined from the quantity of ion current as preliminarily measured with a high-precision ammeter and from the irradiation period. The high-energy heavy ion to be applied is preferably of such a kind that it has a greater mass than the carbon ion and can actually be accelerated by an accelerator.

The kinds of heavy ions that can be used to irradiate the film substrate were already mentioned in connection with the above-described one embodiment of the invention.

Even if the ions to be applied have ranges no more than about one half the thickness of the film substrate, a profile of irradiation-damaged regions that varies from a surface of the film inward can be created by applying similar or dissimilar kinds of ions from both sides of the film in varying dose or by combining lighter ions of longer range with heavier ions of shorter range and applying them from both sides of the film. The varying profile of irradiation-damaged regions helps produce different quantities or lengths of graft chains or different morphologies of polymer structure within the film during the graft reaction to be described later. As a result, by making use of the changes in the distribution of sulfonic acid groups in the graft chains in the film substrate, one can control the distribution of water within the film substrate, as well as the permeation of gaseous fuels through the film.

As already mentioned, heavy ions require extremely high energy in order to penetrate a given thickness of film. For instance, the carbon ion of 22 MeV has a range of about 25 μm through the polyethylene terephthalate film substrate and cannot penetrate it which is typically 50 μm thick. Penetrating through the 50 μm polyethylene terephthalate film substrate requires an energy of about 40 MeV but the carbon ion of 22 MeV will suffice if it is applied from both sides of the film. In order to generate ions of higher energy, a larger accelerator is necessary and more initial investment cost is needed. This is another reason why irradiating the film substrate with ions from both sides is extremely effective for the purpose of producing ion-exchange membranes according to the present invention.

In order to make membranes having large enough ion-exchanging capability, one may increase the dose of ion irradiation. If the dose of ion irradiation is excessive, the film substrate may deteriorate or the overlapping of two or more irradiation-damaged regions may lower the degree of monomer grafting which is described below. On the other hand, if the dose of irradiation is insufficient, the monomer is grafted in such small quantities that the desired ion-exchange capacity is not attained. Hence, the dose of ion irradiation is preferably in the range from $10^4$ to $10^{14}$ per square centimeter.

A polymer ion-exchange membrane according to another embodiment of the present invention can be produced by the following procedure: to the ion-irradiated polyethylene terephthalate film substrate, the monomers described below are added and, after freeze-degassing, the film substrate is heated so that the monomers are grafted onto it and the sulfonyl halide group [—$SO_2X^1$], sulfonic acid ester group [—$SO_3R^1$] or halide group [—$X^2$] in the graft molecular chains is converted to the sulfonic acid group [—$SO_3H$]. In the case of hydrocarbon-based monomer units in the graft chains that contain phenyl groups, ketones, ether groups, etc., sulfonic acid groups may be introduced by treatment with chlorosulfonic acid.

In another embodiment of the invention, the monomer which is to be grafted onto the film substrate (hereunder referred to as "graft monomer" or simply as "monomer") may be chosen from the monomers or monomer/comonomer systems listed below under (11)-(20):

(11) at least one monomer selected from group G, or the group consisting of monomers having a sulfonyl halide group, i.e., $CF_2$=$CF(SO_2X^1)$ (where $X^1$ is the halide group —F or —Cl, as applicable hereinafter), $CH_2$=$CF(SO_2X^1)$ and $CF_2$=$CF(OCH_2(CF_2)_{1-4}SO_2X^1)$;

(12) at least one monomer selected from group H, or the group consisting of monomers having a sulfonic acid ester group, i.e., $CF_2$=$CF(SO_3R^1)$ (where $R^1$ is the alkyl group —$CH_3$, —$C_2H_5$ or —$C(CH_3)_3$, as applicable hereinafter), $CH_2$=$CF(SO_3R^1)$ and $CF_2$=$CF(OCH_2(CF_2)_{1-4}SO_3R^1)$;

(13) at least one monomer selected from group I, or the group consisting of $CF_2$=$CF(O(CH_2)_{1-4}X^2)$ (where $X^2$ is the halide group —Br or —Cl, as applicable hereinafter) and $CF_2$=$CF(OCH_2(CF_2)_{1-4}X^2)$;

(14) two or more monomers selected from at least two of the following groups G-I:

group G consisting of $CF_2=CF(SO_2X^1)$ (where $X^1$ is the halide group —F or —Cl, as applicable hereinafter), $CH_2=CF(SO_2X^1)$ and $CF_2=CF(OCH_2(CF_2)_{1-4}SO_2X^1)$;

group H consisting of $CF_2=CF(SO_3R^1)$ (where $R^1$ is the alkyl group —$CH_3$, —$C_2H_5$ or —$C(CH_3)_3$, as applicable hereinafter), $CH_2=CF(SO_3R^1)$ and $CF_2=CF(OCH_2(CF_2)_{1-4}SO_3R^1)$; and group I consisting of $CF_2=CF(O(CH_2)_{1-4}X^2)$ (where $X^2$ is the halide group —Br or —Cl, as applicable hereinafter) and $CF_2=CF(OCH_2(CF_2)_{1-4}X^2)$;

(15) a monomer/comonomer system comprising at least one monomer selected from group G consisting of $CF_2=CF(SO_2X^1)$ (where $X^1$ is the halide group —F or —Cl, as applicable hereinafter), $CH_2=CF(SO_2X^1)$ and $CF_2=CF(OCH_2(CF_2)_{1-4}SO_2X^1)$, to which at least one comonomer selected from the group consisting of the acrylic monomers $CF_2=CR^2(COOR^3)$ (where $R^2$ is —$CH_3$ or —F, and $R^3$ is —H, —$CH^3$, —$C_2H_5$ or —$C(CH_3)_3$, as applicable hereinafter) and $CH_2=CR^2(COOR^3)$ is added in an amount no more than 50 mol % of the total monomer content;

(16) a monomer/comonomer system comprising at least one monomer selected from group H consisting of $CF_2=CF(SO_3R^1)$ (where $R^1$ is the alkyl group —$CH_3$, —$C_2H_5$ or —$C(CH_3)_3$, as applicable hereinafter), $CH_2=CF(SO_3R^1)$ and $CF_2=CF(OCH_2(CF_2)_{1-4}SO_3R^1)$, to which at least one comonomer selected from the group consisting of the acrylic monomers $CF_2=CR^2(COOR^3)$ (where $R^2$ is —$CH_3$ or —F, and $R^3$ is —H, —$CH^3$, —$C_2H_5$ or —$C(CH_3)_3$, as applicable hereinafter) and $CH_2=CR^2(COOR^3)$ is added in an amount no more than 50 mol % of the total monomer content;

(17) a monomer/comonomer system comprising at least one monomer selected from group I consisting of $CF_2=CF(O(CH_2)_{1-4}X^2)$ (where $X^2$ is the halide group —Br or —Cl, as applicable hereinafter) and $CF_2=CF(OCH_2(CF_2)_{1-4}X^2)$, to which at least one comonomer selected from the group consisting of the acrylic monomers $CF_2=CR^2(COOR^3)$ (where $R^2$ is —$CH_3$ or —F, and $R^3$ is —H, —$CH^3$, —$C_2H_5$ or —$C(CH_3)_3$, as applicable hereinafter) and $CH_2=CR^2(COOR^3)$ is added in an amount no more than 50 mol % of the total monomer content;

(18) at least one monomer selected from group J, or the group consisting of styrene, α-methylstyrene and the styrene derivative monomers 2,4-dimethylstyrene, vinyltoluene and 4-tert-butylstyrene;

(19) at least one monomer selected from group K, or the group consisting of acenaphthylene, indene, the vinylketone $CH_2=CH(COR^4)$ (where $R^4$ is —$CH_3$, —$C_2H_5$ or the phenyl group (—$C_6H_5$)) and the vinylether $CH_2=CH(OR^5)$ (where $R^5$ is —$C_nH_{2n+1}$ (n=1~5), —$CH(CH_3)_2$, —$C(CH_3)_3$ or a phenyl group);

(20) a monomer/comonomer system comprising two or more monomers selected from at least two of the following groups J-L:

group J consisting of styrene, α-methylstyrene and the styrene derivative monomers 2,4-dimethylstyrene, vinyltoluene and 4-tert-butylstyrene;

group K consisting of acenaphthylene, indene, the vinylketone $CH_2=CH(COR^4)$ (where $R^4$ is —$CH_3$, —$C_2H_5$ or the phenyl group (—$C_6H_5$)) and the vinylether $CH_2=CH(OR^5)$ (where $R^5$ is —$C_nH_{2n+1}$ (n=1~5), —$CH(CH_3)_2$, —$C(CH_3)_3$ or a phenyl group); and group L consisting of $CF_2=CR^2(COOR^3)$ (where $R^2$ is —$CH_3$ or —F, and $R^3$ is —H, —$CH^3$, —$C_2H_5$ or —$C(CH_3)_3$, as applicable hereinafter) and $CH_2=CR^2(COOR^3)$.

The acrylic monomers mentioned under (15)-(17) and (20) may be exemplified by $CH_2=C(CH_3)(COOH)$, $CH_2=CF(COOCH_3)$, $CH_2=CF(COOC(CH_3)_3)$, $CF_2=CF(COOCH_3)$, $CF_2=C(CH_3)(COOCH_3)$, etc. These comonomers are such that after grafting, sulfonic acid groups cannot be introduced into their units, so monomer/comonomer systems are preferably formed by adding those comonomers in amounts that do not exceed 50 mol % of the total monomer content.

The monomers and monomer/comonomer systems mentioned under (11)-(20) may be diluted with solvents before use and exemplary solvents include Freon 112 ($CCl_2FCCl_2F$), Freon 113 ($CCl_2FCClF_2$), dichloroethane, chloromethane, n-hexane, alcohol, t-butanol, benzene, toluene, cyclohexane, cyclohexanone and dimethyl sulfoxide.

If desired, the above-mentioned monomers may be grafted in the presence of at least one crosslinking agent selected from the group consisting of divinylbenzene, bis(vinylphenyl)ethane, triallyl cyanurate, triallyl isocyanurate, 3,5-bis(trifluorovinyl)phenol and 3,5-bis(trifluorovinyloxy)phenol, as it is added in an amount no greater than 30 mol % of the total monomer content.

Graft polymerization is performed by the following procedure: the ion-irradiated film substrate is placed in a stainless steel or glass pressure vessel; after fully evacuating the vessel, a monomer or monomers which have been preliminarily freed of oxygen gas by bubbling with an inert gas or freeze-degassing are added to the substrate, which is then subjected to graft polymerization reaction. Graft polymerization may be performed at temperatures ranging from room temperature to the boiling point of the monomer or solvent and it is typically performed at temperatures in the range of 0° C.-100° C. Since the presence of oxygen interferes with the graft reaction, the aforementioned series of operations are performed in an inert gas such as argon gas or nitrogen gas and the monomer or the solution having it dissolved in a solvent are used as freed of oxygen by the usual treatment (i.e., bubbling or freeze-degassing). The degree of grafting (see equation (1) in the Examples) becomes higher as the dose of ion irradiation and the grafting time increase.

Examples of the film substrate that can be employed in the present invention include hydrocarbon-based polymeric films that are highly permeable to the monomer solution. Fluorinated polymer films are not highly permeable to the monomer solution but upon ion irradiation, the monomer will permeate the interior of the film, allowing graft polymerization to proceed inside the film. The polyethylene terephthalate film substrate as an example of the film substrate that can be employed in the present invention may be replaced by a super-high-molecular weight polyethylene, polypropylene, polystyrene, polyamide, aromatic polyamide, polyethylene terephthalate, polyethylene naphthalate, polycarbonate, polyetherketone, polyetheretherketone, polyethersulfone, poly(phenylene sulfide) or polysulfone film substrate.

The polyethylene terephthalate film substrate may also be replaced by polyimide-based polymer films, such as polyimide, polyetherimide, polyamideimide, polybenzimidazole and polyetheretherimide film substrates.

Further substitutes for the polyethylene terephthalate film substrate include film substrates made of poly(vinylidene fluoride), an ethylene-tetrafluoroethylene copolymer, polytetrafluoroethylene, a tetrafluoroethylene-propylene hexafluoride copolymer or a tetrafluoroethylene-per(fluoroalkyl)vinyl ether copolymer.

If crosslinked, the fluorinated films have a crosslinked structure formed in the polymer structure, whereupon the degree of monomer grafting is improved and, further, heat resistance is enhanced to prevent a drop in membrane strength in spite of ion irradiation. Hence, the use of a crosslinked film is suitable for the purpose of fabricating fuel cells that exhibit high performance in high-temperature applications. Consider, for example, the case of using styrene as a monomer to be grafted onto polytetrafluoroethylene; compared to an uncrosslinked polytetrafluoroethylene, a crosslinked polytetrafluoroethylene allows for a marked increase in the degree of grafting and the present inventors already found that 2 to 10 times as many sulfonic acid groups could be introduced into the crosslinked polytetrafluoroethylene as into the uncrosslinked polytetrafluoroethylene (JP 2001-348439 A). For the methods of producing a tetrafluoroethylene-propylene hexafluoride copolymer and a tetrafluoroethylene-per(fluoroalkyl)vinyl ether copolymer that have a crosslinked structure, see Radiation Physical Chemistry, Vol. 42, No. 1/3, pp. 139-142 (1993).

Hence, in another embodiment of the present invention, the polyethylene terephthalate film substrate may, with equal advantage, be replaced by a super-high-molecular weight polyethylene, polypropylene, polystyrene, polyamide, aromatic polyamide, polyethylene terephthalate, polyethylene naphthalate, polycarbonate, polyetherketone, polyetheretherketone, polyethersulfone, poly(phenylene sulfide) or polysulfone film substrate, all having a crosslinked structure.

Also advantageous are polyimide, polyetherimide, polyamideimide, polybenzimidazole or polyetheretherimide film substrates, all having a crosslinked structure.

Similarly, film substrates are advantageous that are made of poly(vinylidene fluoride), an ethylene-tetrafluoroethylene copolymer, polytetrafluoroethylene, a tetrafluoroethylene-propylene hexafluoride copolymer or a tetrafluoroethylene-per(fluoroalkyl)vinyl ether copolymer, all having a crosslinked structure.

After grafting the monomer onto the film substrate, sulfonic acid groups can be introduced by the following procedure: speaking of the monomers mentioned under (11), (14) and (15), the [—$SO_2X^1$] groups in the grafted molecular chains are converted to the sulfonate [—$SO_3M$] groups (where M is the alkali metal Na or K) by reaction in a highly concentrated solution of potassium hydroxide (KOH) or sodium hydroxide (NaOH) in water, a water/alcohol mixture or a water/dimethyl sulfoxide mixture at between room temperature and 100° C. and the sulfonate groups are then converted to the sulfonic acid group [—$SO_3H$] in 1 N-2 N aqueous sulfuric acid at 60° C., thereby producing the desired polymer ion-exchange membrane. The alcohol to be used in the water/alcohol mixture has 1-3 carbon atoms. The mixing ratio of the water/alcohol mixture or water/dimethyl sulfoxide mixture is not limited to any particular value.

Speaking of the monomers mentioned under (12), (14) and (16), the [—$SO_3R^1$] groups in the grafted molecular chains are converted to the sulfonic acid group [—$SO_3H$] either by reaction in about 1 N aqueous potassium hydroxide or an acidic solution such as about 1 N aqueous sulfuric acid at between room temperature and 100° C. to effect hydrolysis. Similarly, speaking of the monomers mentioned under (13), (14) and (17), the halide group [—$X^2$] in the grafted molecular chains is converted to the sulfonate group [—$SO_3M$] (where M is the alkali metal Na or K) by reaction in a solution of a sulfite or a hydrogensulfite in water or a water/alcohol mixture, and the sulfonate group is then converted to the sulfonic acid group [—$SO_3H$].

Further, speaking of the monomers mentioned under (18)-(20), the grafted molecular chains or the phenyl groups, ketones or ether groups in the grafted molecular chains are subjected to reaction with a solution of chlorosulfonic acid in dichloroethane or chloroform at a temperature between room temperature and 100° C. so that the sulfonic acid group is introduced into the graft chains. As for the ketones and ether groups, the sulfonic acid group is introduced into the graft chains by dehydrochlorination on these groups and/or the surrounding structure. In the case of film substrates based on hydrocarbons having an aromatic ring, the introduction of sulfonic acid groups by treatment with chlorosulfonic acid also causes sulfonation of the substrate itself, so the use of film substrates having a crosslinked structure is particularly effective.

In the case where the vinylketone $CH_2=CH(COR^4)$ (see under (19)) or the vinylether $CH_2=CH(OR^5)$ (see under (20)), both having an alkyl group and a phenyl group, is used as a graft monomer, one may change the proportions of the alkyl and phenyl groups in the graft chains such that the resulting difference in the degree of sulfonation of those groups is utilized to control the distribution of sulfonic acid groups in the graft chains; in this way, even the hydrocarbon-based graft chains can be rendered resistant to oxidation.

Speaking further of the monomers mentioned under (15)-(17), the ester groups in the graft chains obtained therefrom can also be converted to the carboxyl group by reaction with a solution of sodium hydroxide (NaOH) or potassium hydroxide (KOH). The carboxyl group is extremely useful for the purpose of maintaining the water content of the graft film which is important for ion conduction in the film when it is used as an ion-exchange membrane.

Aside from the foregoing case involving graft reaction in each of the embodiments of the invention, polymer film substrates made of poly(vinylidene fluoride), an ethylene-tetrafluoroethylene copolymer, a super-high-molecular weight polyethylene, polypropylene, polystyrene and polyamide, which have or have not a crosslinked structure, may be irradiated with high-energy heavy ions at $10^4$-$10^{14}$/$cm^2$ or, alternatively, one surface of such film substrate is irradiated with $10^4$-$10^{14}$/$cm^2$ of high-energy heavy ions that have a range not greater than the film thickness and the other surface is irradiated with varying dose of similar or dissimilar ions having a range not greater than the film thickness such that the two ranges will overlap in the bulk of the film; thereafter, the film substrate is reacted with chlorosulfonic acid so that the sulfonic acid group [—$SO_3H$] is directly introduced into the molecular chains in the film substrate, thereby producing the desired polymer ion-exchange membrane. In this process, ions having a greater mass than the carbon ion are particularly effective. The reason is as follows: the above-described polymer film substrate has the —CH—$CH_2$— unit or the $CH_2$—$CF_2$— unit in the molecule and, upon irradiation with heavy ions, a lot of hydrogen atoms as attached to double bonds or tertiary carbons are generated in the irradiation-damaged regions of the film and react with chlorosulfonic acid to get high concentrations of sulfonic acid groups to be fixed, thereby yielding a polymer ion-exchange membrane that shows the ion-exchanging capability.

After ion irradiation, ionizing radiations such as X-rays, γ-rays and electron beams may be applied to effect graft polymerization of the monomer or reaction with chlorosulfonic acid, thereby producing the desired polymer ion-exchange membrane.

The polymer ion-exchange membrane according to the invention is such that by controlling the quantity of grafts and the amount of sulfonation reaction, or the quantity of sulfonic acid groups introduced, the ion-exchange capacity of the membrane obtained can be varied. For the same monomer, the degree of grafting (see equation (1) in the Examples) increases as the ion is applied in increasing dose and has an increased mass; the degree of grafting also increases as the period of contact between the film substrate and the monomer (i.e., graft time) increases and with the increasing temperature for graft reaction. However, the degree of grafting tends to level off gradually at 60-80%. In the present invention, the degree of grafting ranges preferably from 10% to 150%, more preferably from 15% to 100%, of the film substrate.

The term "ion-exchange capacity" as used herein means the quantity of ion-exchange groups per gram in weight of the dry ion-exchange membrane, as expressed in meq/g. Depending on the kind of graft monomer, the ion-exchange capacity is no more than 0.3 meq/g when the degree of grafting is 10% or less; the membrane will swell excessively if the degree of grafting is more than 150%. In other words, the ion-exchange capacity increases if the degree of grafting is increased to introduce more ion-exchange groups. However, if too many ion-exchange groups are introduced, the membrane will swell in a hydrous state to have lower strength. The polymer ion-exchange membrane of the invention has preferably an ion-exchange capacity ranging from 0.3 meq/g to 2.5 meq/g, more preferably from 0.5 meq/g to 2.0 meq/g.

The polymer ion-exchange membrane of the invention has the advantage that its water content can be controlled by choosing the substrate for grafting or adjusting the quantity of sulfonic acid groups to be introduced or the molecular structure of the graft monomer. In the case of using the membrane as an ion-exchange membrane in fuel cells, a too low water content is not preferred since the slightest change in the operating conditions will change the electrical conductivity and gas permeation coefficient. In the conventional Nafion membrane, almost all molecular chains are composed of $-CF_2-$, so if the cell is operated at 80° C. or higher temperatures, a shortage of water molecules occurs in the membrane and its electrical conductivity will drop rapidly.

In contrast, the ion-exchange membrane of the invention features that in addition to the sulfonic acid group, hydrophilic groups such as the carboxyl group and hydrocarbon structures can be introduced into the graft chains and, hence, the water content which depends primarily upon the quantity of sulfonic acid groups can be controlled over the range of 10-120 wt %. Generally, the water content increases with the increasing ion-exchange capacity and in the case of the ion-exchange membrane of the invention, the water content can be adjusted to lie between 10 and 120 wt %, preferably between 20 and 80 wt %.

The polymer membrane of the invention has another advantage that even if sulfonic acid groups are introduced into fine pores in a large quantity equivalent to an ion-exchange capacity of about 2.5 meq/g, the membrane retains sufficient mechanical characteristics and dimensional stability to warrant commercial use. Membranes having high ion-exchange capacity and good mechanical characteristics are extremely important for commercial applications.

The electrical conductivity of the polymer ion-exchange membrane relates to the ion-exchange capacity and the higher it is, the lower the electrical resistance of the membrane, providing it with better performance as the electrolyte membrane. For example, if the ion-exchange membrane has an electrical conductivity of 0.05 $(\Omega \cdot cm)^{-1}$ or less at 25° C., it often occurs that the output performance of the fuel cell incorporating the membrane drops markedly; hence, most ion-exchange membranes are designed to have electrical conductivities of at least 0.05 $(\Omega \cdot cm)^{-1}$, and at least 0.10 $(\Omega \cdot cm)^{-1}$ if higher performance is required. The ion-exchange membranes according to the present invention showed electrical conductivities at 25° C. that were comparable to or higher than the values with the Nafion$^{RT}$ membrane. This would be because the pathways of ion conduction were limited to inside the fine pores or to the graft chains in the irradiation-damaged regions, thus permitting more efficient ion conduction.

Another possible way to enhance the electrical conductivity of the ion-exchange membrane is by decreasing its thickness. However, with the current technology of ion-exchange membrane fabrication, unduly thin products will easily break and are difficult to produce. Therefore, ion-exchange membranes 30-200 μm thick are typically employed. In the case of the present invention, membrane thicknesses in the range of 10-300 μm are effective, with the preferred range being from 20 to 150 μm.

Methanol is currently considered as one of the fuel candidates for fuel cells. The fluorinated sulfonic acid polymer Nafion$^{RT}$ membrane has no crosslinked structure between molecules, so it is swollen considerably by methanol and the fuel cross-over, i.e., the fuel methanol passing through the cell membrane to diffuse from the anode (fuel electrode) to the cathode (air electrode), causes a big problem by lowering the efficiency of power generation.

In contrast, the ion-exchange membrane of the invention has the advantage that the water content of the exchange membrane can be controlled by adjusting the quantity of sulfonic acid groups introduced and the molecular structure of the graft monomer. In addition, the sulfonic acid groups are present only within the pores which are trajectories of ions or in linear irradiation-damaged regions alone, so the overall swelling of the membrane and the fuel cross-over can be reduced.

Ion irradiation can be applied to many kinds of polymer films irrespective of their molecular or crystal structures. Therefore, in the polymer ion-exchange membrane of the invention, as long as the film substrate is impermeable to methanol, the movement of hydrogen ions occurs only through those graft chains within the pores, or in the regions damaged by ion irradiation, which were converted to sulfonic acid groups, so the swelling that occurs in the membrane due to methanol and other alcohols is hardly recognizable. Therefore, the polymer ion-exchange membrane of the invention is useful as a membrane in direct-methanol fuel cells which use methanol directly at the fuel cell anode without a reformer.

In the fuel cell membrane technology, the oxidation resistance of the membrane is an extremely important characteristic that relates to its endurance (service life). More specifically, OH radicals and the like that are generated during cell operation will attack the ion-exchange membrane to cause its deterioration. The polymer ion-exchange membrane fabricated by grafting a hydrocarbon-based styrene onto a polymer film and then sulfonating the polystyrene graft chains is extremely low in oxidation resistance. Take, for example, a polystyrene graft crosslinked fluororesin ion-exchange membrane obtained by sulfonating polystyrene chains with 93% degree of grafting; when immersed in 3% aqueous hydrogen peroxide at 80° C., this ion-exchange membrane deteriorates in about 60 minutes and the ion-exchange capacity decreases by about one half (see Comparative Example 3 below). This is because the polystyrene chains are easily broken up by the attack of OH radicals.

In contrast, the polymer ion-exchange membrane according to the invention is characterized in that the graft chains comprise a polymer of fluorine-containing monomer or a highly crosslinked product of a hydrocarbon-based monomer; in addition, the graft polymer or crosslinked product is within the superfine pores or in the irradiation-damaged regions, so the membrane is extremely high in oxidation resistance and its ion-exchange capacity hardly changes even if it is immersed in 3% aqueous hydrogen peroxide at 80° C. for 24 hours or longer.

As described above, the polymer ion-exchange membrane of the invention has satisfactory dimensional stability and high resistance to oxidation and methanol and, what is more, the ion-exchange capacity which is an important membrane characteristic can be controlled over a wide range from 0.3 meq/g to 2.5 meq/g.

EXAMPLES

The present invention is further illustrated by the following examples and comparative examples, to which the invention is by no means limited. While various values of measurements are shown, they were determined by the following methods.

(1) Degree of Grafting

If the film substrate is referred to as the backbone chain portion and the graft polymer of a fluorine-containing monomer either alone or in combination with a hydrocarbon-based monomer and the like is referred to as the graft chain portion, the weight ratio of the graft chain portion to the backbone chain portion is expressed as the degree of grafting ($X_{dg}$ (wt %)) according to the following equation:

$$X_{dg} = 100(W_2 - W_1)/W_1 \tag{1}$$

$W_1$: the weight of the film substrate (g) before grafting
$W_2$: the weight of the film (in dry state) after grafting.

(2) Ion-Exchange Capacity

The ion-exchange capacity ($I_{ex}$ (meq/g)) of the membrane is expressed by the following equation:

$$I_{ex} = n(\text{acid group})_{obs}/W_d \tag{2}$$

n(acid group)$_{obs}$: the concentration of acid groups (mM/g) in sulfonated graft film (ion-exchange membrane)
$W_d$: the dry weight (g) of sulfonated graft film (ion-exchange membrane).

To assure accuracy in the measurement of n(acid group)$_{obs}$, the membrane was immersed again in 1 M (1 mole) aqueous sulfuric acid at 50° C. for 4 hours until it became a complete acid form (H form). Thereafter, the membrane was immersed in 3 M aqueous NaCl at 50° C. for 4 hours until it became a —SO$_3$Na form. The replaced protons (H$^+$) were subjected to neutralization titration with 0.2 N NaOH, thereby determining the concentration of acid groups in the membrane.

(3) Water Content

The ion-exchange membrane of H form stored in water at room temperature was recovered and wiped lightly; about one minute later, the weight of the membrane or $W_s$ (g) was measured; the membrane was then vacuum-dried at 60° C. for 16 hours and its dry weight, $W_d$ (g), was measured; using $W_s$ and $W_d$, the water content of the membrane was determined by the following equation:

$$\text{Water content}(\%) = 100 \cdot (W_s - W_d)/W_d \tag{3}$$

(4) Electrical Conductivity

To determine the electrical conductivity of the ion-exchange membrane, its resistance ($R_m$) was measured by the AC method [Shinjikken Kagaku Koza (A New Course in Experimental Chemistry) 19, Kobunshi Kagaku (Polymer Science), p. 992, Maruzen] using a conventional membrane resistance measuring cell and E-4925A (LCR meter of Hewlett-Packard). After filling the cell with 1 M aqueous sulfuric acid, the resistance between Pt electrodes (5 mm apart) was measured both with and without the membrane. The electrical conductivity (specific conductivity) of the membrane was calculated by the following equation:

$$\kappa = 1/R_m \cdot d/S \, (\Omega^{-1} \text{cm}^{-1}) \tag{4}$$

$\kappa$: the electrical conductivity ($\Omega^{-1}$ cm$^{-1}$) of the membrane
d: the thickness (cm) of the ion-exchange membrane
S: the live area (cm$^2$) of the ion-exchange membrane.

For comparison, the electrical conductivity was also measured by the DC method using a cell similar to that described in Mark W. Verbrugge, Robert F. Hill et al. (J. Electrochem. Soc., 137, 3770-3777 (1990)), as well as a potentiostat and a function generator. The measurements by the AC method correlated well to those by the DC method. The data in Table 1 below refer to the measurements by the AC method.

(5) Oxidation Resistance (Residual wt %)

The ion-exchange membrane was vacuum-dried at 60° C. for 16 hours and its weight is written as $W_3$; the membrane was treated with. 3% hydrogen peroxide at 80° C. for 24 hours and dried to give a weight written as $W_4$; from $W_3$ and $W_4$, the oxidation resistance is determined by the following equation:

$$\text{Oxidation resistance} = 100(W_4/W_3) \tag{5}$$

(6) Linear Swelling (%) of the Membrane

A membrane of sulfonic acid form having a length of $L_0$ on one side in a wet state (in water) at room temperature was immersed in a methanol solution under specified conditions, whereupon it came to have a length of $L_M$ on the same one side in a wet state (in methanol solution) at room temperature. From $L_0$ and $L_M$, the percent linear swelling of the membrane is determined by the following equation:

$$\text{Percent linear swelling} = 100(L_M/L_0) \tag{6}$$

Example 1

In order to obtain a crosslinked poly(vinylidene fluoride) film substrate (hereunder abbreviated as PVDF), irradiation was performed under the following conditions. A 25 μm thick poly(vinylidene fluoride) film (Kureha Chemical Industry Co., Ltd.) measuring 10 cm×10 cm was placed in a SUS autoclaved irradiation vessel (7 cm$^{ID}$×30 cm$^H$) and the interior of the vessel was evacuated to 10$^{-3}$ Torr, followed by purging with argon gas. Thereafter, γ-rays from $^{60}$Co were applied at a dose rate of 5 kGy/h to give a total dose of 500 kGy (for 100 hours) at room temperature. To evaluate the state of crosslinking in the irradiated PVDF film, the degree of gelation was measured using dimethylformamide as a solvent and it turned out to be 80%.

The resulting crosslinked PVDF was installed on an irradiation pad within an irradiation apparatus (60 cm$^{ID}$×100 cm$^H$) on the beam line of an AVF cyclotron accelerator (Japan Atomic Energy Research Institute, Takasaki Radiation Chemistry Research Establishment) and after evacuating the interior of the apparatus to 10$^{-6}$ Torr, 450 MeV of Xe (xenon) ions were applied at 3×10$^8$/cm$^2$. The film was taken out of the irradiation vessel and immersed in 9N aqueous KOH at 60° C. for 100 hours in order to etch the sites that had been damaged by ion irradiation. After thorough washing with water, the film was dried and observed under a scanning electron microscope to measure the average pore size, which was found to be 0.4 μm.

The perforated PVDF film substrate was cut to a size of 2 cm×2 cm and placed in a glass separable vessel equipped with a cock (3 cm×15 cm$^H$); the vessel was charged with 1,2,2-trifluoroethylene sulfonyl fluoride (CF$_2$=CF(SO$_2$F)) until the film was soaked in it; by repeated freezing and degassing cycles, the liquid monomer and the perforated film were freed of air. Finally, the interior of the glass vessel was sealed by argon gas purge. Under this condition, the perforated PVDF film was irradiated with γ-rays at a dose rate of 10 kGy/h to give a total dose of 300 kGy at room temperature. After the irradiation, the film was subjected to reaction at 60° C. for 24 hours, washed with toluene and acetone in that order, and dried. The degree of grafting in the film as determined by equation (1) was 18%.

The resulting graft perforated PVDF film was subjected to reaction in 20 wt % KOH in a dimethyl sulfoxide/water mixture (1:2) at 80° C. for 24 hours. After the reaction, the membrane was recovered, washed with water and treated in 2N aqueous sulfuric acid at 60° C. for 4 hours. For the degree of grafting in the membrane obtained in Example 1, its ion-exchange capacity (eq. (2)), water content (eq. (3)) and electrical conductivity (eq. (4)), see Table 1 below.

Example 2

A 38-μm thick poly(ethylene terephthalate) film (Hoechst AG, hereunder abbreviated as PET) was processed as in Example 1; it was installed on an irradiation pad within an irradiation apparatus (60 cm$^{ID}$×100 cm$^H$) on the beam line of an AVF cyclotron accelerator (Japan Atomic Energy Research Institute, Takasaki Radiation Chemistry Research Establishment) and after evacuating the interior of the apparatus to 10$^{-6}$ Torr, 450 MeV of Xe (xenon) ions were applied at 3×10$^8$/cm$^2$. The film was taken out of the irradiation vessel and immersed in 0.2N aqueous NaOH at 70° C. for 17 hours in order to etch the sites that had been damaged by ion irradiation. After thorough washing with water, the film was dried and observed under a scanning electron microscope to measure the average pore size, which was found to be 0.5 μm.

The resulting perforated poly(ethylene terephthalate) film substrate was cut to a size of 2 cm×2 cm and placed in a glass separable vessel equipped with a cock (3 cm$^{ID}$×15 cm$^H$); the vessel was charged with 3-chloro-2,2,3,3-tetrafluoropropoxytrifluoroethylene (CF$_2$=CF(OCH$_2$(CF$_2$)$_2$Cl)) until the film was soaked in it; by repeated freezing and degassing cycles, the liquid monomer and the perforated film were freed of air. Finally, the interior of the glass vessel was sealed by argon gas purge. Under this condition, the perforated PVDF film was irradiated with γ-rays at a dose rate of 10 kGy/h to give a total dose of 300 kGy at room temperature. After the irradiation, the film was subjected to reaction at 60° C. for 24 hours, washed with toluene and acetone in that order, and dried. The degree of grafting in the film as determined by equation (1) was 38%.

The resulting graft poly(ethylene terephthalate) membrane was put into a pressure autoclave, which was charged with a mixture of 20 wt % aqueous sodium sulfite (Na$_2$SO$_3$) and isopropanol (at 1:3 ratio to water) until it soaked the membrane. By simple bubbling, the air in the autoclave was replaced by nitrogen. The autoclave was then placed in an oil bath at 120° C. and subjected to reaction for 30 minutes. After being cooled, the membrane was taken out of the autoclave, washed with water and treated in 2N aqueous sulfuric acid at 60° C. for 4 hours. For the degree of grafting in the membrane obtained in Example 2, its ion-exchange capacity, water content and electrical conductivity, see Table 1 below.

Example 3

As in Example 1, 450 MeV of Xe (xenon) ions were applied at 3×10$^8$/cm$^2$.

The perforated PVDF film substrate was cut to a size of 2 cm×2 cm and placed in a glass separable vessel equipped with a cock (3 cm$^{ID}$×15 cm$^H$); the vessel was charged with a solution comprising 1,2,2-trifluoroethylene sulfonyl fluoride (CF$_2$=CFSO$_2$F) and methyl-1,2,2-trifluoroacrylate (CF$_2$=CFCOOCH$_3$) at a volume ratio of 3:2 until the film was soaked in it; by repeated freezing and degassing cycles, the liquid monomer and the perforated film were freed of air. Finally, the interior of the glass vessel was sealed by argon gas purge. Under this condition, the perforated PVDF film was irradiated with γ-rays at a dose rate of 10 kGy/h to give a total dose of 160 kGy at room temperature. After the irradiation, the film was subjected to reaction at 60° C. for 24 hours, washed with toluene and acetone in that order, and dried. The degree of grafting in the film as determined by equation (1) was 26%.

The resulting graft perforated PVDF film was subjected to reaction in 20 wt % KOH in a dimethyl sulfoxide/water mixture (1:2) at 80° C. for 24 hours. After the reaction, the membrane was recovered, washed with water and treated in 2N aqueous sulfuric acid at 60° C. for 4 hours. For the degree of grafting in the membrane obtained in Example 3, its ion-exchange capacity, water content and electrical conductivity, see Table 1 below.

Example 4

As in Example 2, 450 MeV of Xe (xenon) ions were applied at 3×10$^8$ cm$^2$.

The perforated PET film substrate was cut to a size of 2 cm×2 cm and placed in a glass separable vessel equipped with a cock (3 cm$^{ID}$×15 cm$^H$); the vessel was charged with a solution comprising 1,2,2-trifluoroethylene sulfonyl fluoride (CF$_2$=CFSO$_2$F) and methyl-1-fluoroacrylate (CH$_2$=CFCOOCH$_3$) at a volume ratio of 3:1 until the film was soaked in it; by repeated freezing and degassing cycles, the liquid monomer and the perforated film were freed of air. Finally, the interior of the glass vessel was sealed by argon gas purge. Under this condition, the perforated PET film was irradiated with γ-rays at a dose rate of 10 kGy/h to give a total dose of 100 kGy at room temperature. After the irradiation, the film was subjected to reaction at 60° C. for 24 hours, washed with toluene and acetone in that order, and dried. The degree of grafting in the film as determined by equation (1) was 48%.

The resulting graft perforated PET film was subjected to reaction in 2N KOH in methanol for 12 hours, followed by treatment with aqueous sulfuric acid. For the degree of grafting in the membrane obtained in Example 4, its ion-exchange capacity, water content and electrical conductivity, see Table 1 below.

Example 5

As in Example 1, 450 MeV of Xe (xenon) ions were applied at 3×10$^8$/cm$^2$.

The perforated PVDF film substrate was cut to a size of 2 cm×2 cm and placed in a glass separable vessel equipped with a cock (3 cm$^{ID}$×15 cm$^H$); the vessel was charged with a solution comprising 2-bromo-1,1,2,2-tetrafluoroethoxytrifluoroethylene ($CF_2$=$CF(O(CF_2)_2Br)$) and methyl-1,2,2-trifluoroacrylate ($CF_2$=$CFCOOCH_3$) at a volume ratio of 3:2 until the film was soaked in it; by repeated freezing and degassing cycles, the liquid monomer and the perforated film were freed of air. Finally, the interior of the glass vessel was sealed by argon gas purge. Under this condition, the perforated PVDF film was irradiated with γ-rays at a dose rate of 10 kGy/h to give a total dose of 200 kGy at room temperature. After the irradiation, the film was subjected to reaction at 60° C. for 24 hours, washed with toluene and acetone in that order, and dried. The degree of grafting in the film as determined by equation (1) was 23%.

The resulting graft PVDF membrane was put into a pressure autoclave, which was charged with a mixture of 20 wt % aqueous sodium sulfite ($Na_2SO_3$) and isopropanol (at 1:3 ratio to water) until it soaked the membrane. By simple bubbling, the air in the autoclave was replaced by nitrogen. The autoclave was then placed in an oil bath at 120° C. and subjected to reaction for 30 minutes. After being cooled, the membrane was taken out of the autoclave, washed with water and treated in 2N aqueous sulfuric acid at 60° C. for 4 hours. For the degree of grafting in the membrane obtained in Example 5, its ion-exchange capacity, water content and electrical conductivity, see Table 1 below.

Example 6

As in Example 2, a PET film substrate was irradiated with 500 MeV of Au (gold) ions at $3 \times 10^8/cm^2$. The film was taken out of the irradiation vessel and immersed in 0.2N aqueous NaOH at 70° C. for 17 hours in order to etch the sites that had been damaged by ion irradiation. After thorough washing with water, the film was dried and observed under a scanning electron microscope to measure the average pore size, which was found to be 0.6 μm.

The resulting perforated PET film substrate was cut to a size of 2 cm×2 cm and placed in a glass separable vessel equipped with a cock (3 $cm^{ID} \times 15$ $cm^H$); the vessel was charged with a solution comprising 2-bromo-1,1,2,2-tetrafluoroethoxytrifluoroethylene ($CF_2$=$CF(O(CF_2)_2Br)$) and methyl-1-fluoroacrylate ($CH_2$=$CFCOOCH_3$) at a volume ratio of 3:2 until the film was soaked in it; by repeated freezing and degassing cycles, the liquid monomer and the perforated film were freed of air. Finally, the interior of the glass vessel was sealed by argon gas purge. Under this condition, the perforated PET film was irradiated with γ-rays at a dose rate of 10 kGy/h to give a total dose of 200 kGy at room temperature. After the irradiation, the film was subjected to reaction at 60° C. for 24 hours, washed with toluene and acetone in that order, and dried. The degree of grafting in the film as determined by equation (1) was 23%.

The resulting graft perforated PET membrane was put into a pressure autoclave, which was charged with a mixture of 20 wt % aqueous sodium sulfite ($Na_2SO_3$) and isopropanol (at 1:3 ratio to water) until it soaked the membrane. By simple bubbling, the air in the autoclave was replaced by nitrogen. The autoclave was then placed in an oil bath at 120° C. and subjected to reaction for 30 minutes. After being cooled, the membrane was taken out of the autoclave, washed with water and treated in 2N aqueous sulfuric acid at 60° C. for 4 hours. For the degree of grafting in the membrane obtained in Example 6, its ion-exchange capacity, water content and electrical conductivity, see Table 1 below.

Example 7

As in Example 1, 450 MeV of Xe (xenon) ions were applied at $3 \times 10^8/cm^2$.

The resulting perforated PVDF film substrate was cut to a size of 2 cm×2 cm and placed in a glass separable vessel equipped with a cock (3 $cm^{ID} \times 15$ $cm^H$); after being evacuated, the vessel was purged with argon gas. Under this condition, the PVDF film substrate was irradiated with γ-rays at a dose rate of 2.5 kGy/h to give a total dose of 60 kGy at room temperature. After removing air by freezing and degassing cycles, styrene and 2,4-dimethylstyrene were mixed at a volume ratio of 1:1 and to the resulting solution, 7 vol % divinylbenzene was added. The pressure glass separable vessel containing the irradiated film was charged with the resulting solution until the film was soaked in it. The vessel was sealed with argon gas and with stirring, the film was subjected to post-graft polymerization at 60° C. for 24 hours. After the reaction, the film was washed with toluene and acetone in that order, and dried. The degree of grafting in the film as determined by equation (1) was 78%.

The resulting graft PVDF film was sulfonated with 0.5N chlorosulfonic acid in dichloroethane. For the degree of grafting in the membrane obtained in Example 7, its ion-exchange capacity, water content and electrical conductivity, see Table 1 below.

Example 8

A PET film substrate (38 μm thick; product of Hoechst AG) measuring 10 cm×10 cm was installed on a scan beam irradiation pad in an irradiation apparatus (60 $cm^{ID} \times 100$ $cm^H$) on the beam line of an AVF cyclotron accelerator and after evacuating the interior of the vessel to $10^{-6}$ Torr, the substrate was irradiated with 450 MeV of Xe ions at $3 \times 10^8/cm^2$. Ion current measurement was conducted by preliminarily applying ion beams to an irradiation pad of the same design and the dose of irradiation was determined by measuring the quantity of charge on the ions passing through the film under irradiation.

The film was taken out of the irradiation vessel, immediately cut to a size of 2 cm×2 cm, and placed in a glass separable vessel equipped with a cock (3 $cm^{ID} \times 15$ $cm^H$); the vessel was then charged with 1,2,2-trifluoroethylene sulfonyl fluoride ($CF_2$=$CF(SO_2F)$) until the film was soaked in it; by repeated freezing and degassing cycles, the liquid monomer and the perforated film were freed of air. Finally, the interior of the glass vessel was sealed by argon gas purge. Under this condition, the glass vessel was left to stand at 60° C. for 48 hours and the film was then recovered, washed with toluene and acetone in that order, and dried under reduced pressure. The degree of grafting in the film as determined by equation (1) was 17%.

The resulting graft PET film was subjected to reaction in 20 wt % KOH in a methanol/water mixture (1:2) at 80° C. for 24 hours. After the reaction, the film was recovered, washed with water and treated in 2N aqueous sulfuric acid at 60° C. for 4 hours. For the degree of grafting in the polymer ion-exchange membrane obtained in Example 8, its ion-exchange capacity, water content and electrical conductivity, see Table 1 below.

Example 9

As in Example 8, 450 MeV of Xe ions were applied at $3 \times 10^8/cm^2$. The resulting ion-irradiated PET film substrate was cut to a size of 2 cm×2 cm and placed in a glass separable vessel equipped with a cock (3 $cm^{ID} \times 15$ $cm^H$); the vessel was then charged with 1,2,2-trifluoroethylene sulfonyl methoxide ($CF_2$=$CF(SO_3CH_3)$) until the film was soaked in it; by repeated freezing and degassing cycles, the liquid monomer and the perforated film were freed of air. Finally, the interior of the glass vessel was sealed by argon gas purge. Under this condition, the glass vessel was left to stand at 60° C. for 48 hours and the film was then recovered, washed with toluene and acetone in that order, and dried under reduced pressure. The degree of grafting in the film as determined by equation (1) was 22%.

The resulting graft PET film was subjected to reaction in 20 wt % KOH in a propanol/water mixture (1:2) at 80° C. for 12 hours. After the reaction, the film membrane was recovered, washed with water and treated in 1 N aqueous sulfuric acid at 60° C. for 4 hours. For the degree of grafting in the polymer ion-exchange membrane obtained in Example 9, its ion-exchange capacity, water content and electrical conductivity, see Table 1 below.

Example 10

As in Example 8, 520 MeV of Kr (krypton) ions were applied at $3\times10^8/cm^2$. The resulting ion-irradiated PET film was cut to a size of 2 cm×2 cm and placed in a glass separable vessel equipped with a cock (3 $cm^{ID}\times15$ $cm^H$); the vessel was then charged with 1,2,2-trifluoroethylene sulfonyl fluoride ($CF_2=CFSO_2F$) and methyl-1,2,2-trifluoroacrylate ($CF_2=CFCOOCH_3$) at a volume ratio of 3:2 until the film was soaked in it; by repeated freezing and degassing cycles, the liquid monomer and the perforated film were freed of air. Finally, the interior of the glass vessel was sealed by argon gas purge. Under this condition, the glass vessel was left to stand at 60° C. for 48 hours and the film was then recovered, washed with toluene and acetone in that order, and dried under reduced pressure. The degree of grafting in the film as determined by equation (1) was 36%.

The resulting graft PET film was subjected to reaction in 20 wt % KOH in an isopropanol/water mixture (1:2) at 80° C. for 24 hours. After the reaction, the film was recovered, washed with water and treated in 2N aqueous sulfuric acid at 60° C. for 4 hours. For the degree of grafting in the polymer ion-exchange membrane obtained in Example 10, its ion-exchange capacity, water content and electrical conductivity, see Table 1 below.

Example 11

A crosslinked PVDF film substrate was prepared as in Example 1 and subsequently irradiated with 450 MeV of Xe ions at $3\times10^8/cm^2$. After the irradiation, the PVDF film substrate was immediately cut to a size of 2 cm×2 cm and placed in a glass separable vessel equipped with a cock (3 $cm^{ID}\times15$ $cm^H$); the vessel was then charged with 1,2,2-trifluoroethylene sulfonyl fluoride ($CF_2=CF(SO_2F)$) and methyl-1-fluoroacrylate ($CH_2=CF(COOCH_3)$) at a volume ratio of 3:1 until the film was soaked in it; by repeated freezing and degassing cycles, the liquid monomer and the perforated film were freed of air. Finally, the interior of the glass vessel was sealed by argon gas purge. Under this condition, the glass vessel was left to stand at 60° C. for 48 hours and the film was then recovered, washed with toluene and acetone in that order, and dried under reduced pressure. The degree of grafting in the film as determined by equation (1) was 27%.

The resulting graft PVDF film was subjected to reaction in 20 wt % KOH in a dimethyl sulfoxide/water mixture (1:2) at 80° C. for 24 hours. After the reaction, the film membrane was recovered, washed with water and treated in 2N aqueous sulfuric acid at 60° C. for 4 hours. For the degree of grafting in the polymer ion-exchange membrane obtained in Example 11, its ion-exchange capacity, water content and electrical conductivity, see Table 1 below.

Example 12

As in Example 8, 450 MeV of Xe ions were applied at $3\times10^8/cm^2$. The resulting ion-irradiated PET film substrate was cut to a size of 2 cm×2 cm and placed in a glass separable vessel equipped with a cock (3 $cm^{ID}\times15$ $cm^H$); styrene ($CH_2=CH(C_6H_5)$) and vinyltoluene ($CH_2=CH(C_6H_4(CH_3))$) were mixed at a volume ratio of 2:1 and to the resulting solution, 5 vol % divinylbenzene was added; the vessel was then charged with the resulting solution until the film was soaked in it; by repeated freezing and degassing cycles, the liquid monomer and the perforated film were freed of air. Finally, the interior of the glass vessel was sealed by argon gas purge. Under this condition, the glass vessel was left to stand at 60° C. for 16 hours and the film was then recovered, washed with toluene and acetone in that order, and dried under reduced pressure. The degree of grafting in the film as determined by equation (1) was 73%.

The resulting graft PET membrane was sulfonated by being left to stand in 0.5 M solution of chlorosulfonic acid (the solvent being 1,2-dichloroethane) at room temperature for 12 hours. For the degree of grafting in the polymer ion-exchange membrane obtained in Example 12, its ion-exchange capacity, water content and electrical conductivity, see Table 1 below.

Example 13

In order to obtain a crosslinked polytetrafluoroethylene (hereunder abbreviated as PTFE), irradiation was performed under the following conditions. A 50 μm thick PTFE film (NITTO DENKO CORP.) measuring 10 cm×10 cm square was placed in a SUS autoclaved irradiation vessel (7 $cm^{ID}\times30$ $cm^H$) equipped with a heater and the interior of the vessel was evacuated to $10^{-3}$ Torr, followed by purging with argon gas. Thereafter, the PTFE film was heated with the electric heater to a temperature of 340° C. and γ-rays from $^{60}$Co were applied at a dose rate of 3 kGy/h for 30 hours to give a total dose of 90 kGy at room temperature. After the irradiation, the vessel was cooled and the PTFE film was recovered. The crosslinked PTFE film thus obtained by irradiation at the elevated temperature had a higher degree of transparency, indicating that the size of crystal grains was considerably smaller than in the uncrosslinked PTFE.

As in Example 8, the resulting PTFE film was irradiated on one surface of the film substrate with 20 MeV of C (carbon) ions at $4\times10^8/cm^2$ and on the other surface (reverse side) with 120 MeV of Ar (argon) ions at $3\times10^8/cm^2$. The ion-irradiated PTFE film was cut to a size of 2 cm×2 cm and placed in a glass separable vessel equipped with a cock (3 $cm^{ID}\times15$ $cm^H$); styrene ($CH_2=CH(C_6H_5)$) and vinyltoluene ($CH_2=CH(C_6H_4(CH_3))$) were mixed at a volume ratio of 2:1 and to the resulting solution, 5 vol % divinylbenzene was added; the vessel was then charged with the resulting solution until the film was soaked in it; by repeated freezing and degassing cycles, the liquid monomer and the perforated film were freed of air. Finally, the interior of the glass vessel was sealed by argon gas purge. Under this condition, the glass vessel was left to stand at 60° C. for 16 hours and the film was then recovered, washed with toluene and acetone in that order, and dried under reduced pressure. The degree of grafting in the film as determined by equation (1) was 66%.

The resulting graft PTFE membrane was sulfonated by being left to stand in 0.5 M solution of chlorosulfonic acid (the solvent being 1,2-dichloroethane) at room temperature for 12 hours. For the degree of grafting in the polymer ion-exchange membrane obtained in Example 13, its ion-exchange capacity, water content and electrical conductivity, see Table 1 below.

Example 14

A crosslinked PVDF film was prepared as in Example 11 and subsequently irradiated with 30 MeV of C ions at $5 \times 10^8/cm^2$ using the same equipment as in Example 8. The ion-irradiated PVDF film was cut to a size of 2 cm×2 cm and placed in a glass separable vessel equipped with a cock (3 $cm^{ID} \times 15$ $cm^H$); the vessel was charged with 0.5 M solution of chlorosulfonic acid (the solvent being 1,2-dichloroethane) until the film was soaked in it. After sealing the glass vessel, the film was sulfonated by being left to stand at room temperature for 24 hours.

For the degree of grafting in the polymer ion-exchange membrane obtained in Example 14, its ion-exchange capacity, water content and electrical conductivity, see Table 1 below.

Example 15

The degree of swelling due to alcohol of the polymer ion-exchange membrane was measured. The membranes prepared in Examples 1-14 and Nafion 117 (Du Pont) were immersed in 3N aqueous sulfuric acid to convert the sulfonic acid groups to H form. Then, the membranes were immersed in water at room temperature and their dimensions were measured in the wet state. Subsequently, the membranes were soaked in an aqueous solution of methanol at a concentration of 80 vol %, held at 60° C. for 3 hours; thereafter, the membranes were left to stand overnight so that it cooled down to room temperature and the resulting dimensional changes were measured. The results are shown in Table 1. Compared to Nafion 117, the membranes prepared in Examples 1-14 were hardly swollen by methanol and, hence, are very effective as a membrane in direct-methanol fuel cells.

Table 1 thusly demonstrates the effectiveness of the present invention.

Comparative Examples 1 and 2

Nafion 115 and Nafion 117 (both being products of Du Pont) that are shown in Table 1 below were measured for the ion-exchange capacity, water content and electrical conductivity. The results are shown in Table 1 under "Comparative Example 1" and "Comparative Example 2".

Comparative Example 3

A crosslinked PTFE film (50 μm thick) as prepared in Example 1 was placed in a glass separable vessel equipped with a cock (3 $cm^{ID} \times 15$ $cm^H$), which was degassed and purged with argon gas. Under this condition, the crosslinked PTFE film was again irradiated with γ-rays at a dose rate of 10 kGy/h to give a total dose of 45 kGy at room temperature. By bubbling of argon gas, a styrene monomer had its oxygen content replaced with argon gas. Into the glass vessel containing the crosslinked PTFE film, the styrene monomer was introduced until the membrane was immersed in it. With stirring, reaction was performed in the vessel at 60° C. for 6 hours. Thereafter, the graft copolymerized membrane was washed with toluene and acetone in that order, and dried. The degree of grafting was 93%. The resulting graft polymerized membrane was immersed in 0.5 M chlorosulfonic acid (using 1,2-dichloroethane as a solvent) and sulfonation reaction was carried out at 60° C. for 24 hours. The membrane was subsequently washed with water to have sulfonic acid groups introduced into it.

Comparative Example 4

A crosslinked PTFE film (50 μm thick) as prepared in Example 13 was placed in a glass separable vessel equipped with a cock (3 $cm^{ID} \times 15$ $cm^H$), which was degassed and purged with argon gas. Under this condition, the crosslinked PTFE film was again irradiated with γ-rays at a dose rate of 10 kGy/h to give a total dose of 45 kGy at room temperature. By bubbling of argon gas, a styrene monomer had its oxygen content replaced with argon gas. Into the glass vessel containing the crosslinked PTFE film, the styrene monomer was introduced until the membrane was immersed in it. With stirring, reaction was performed in the vessel at 60° C. for 6 hours. Thereafter, the graft copolymerized membrane was washed with toluene and acetone in that order, and dried. The degree of grafting was 93%. The resulting graft polymerized membrane was immersed in 0.5 M chlorosulfonic acid (using 1,2-dichloroethane as a solvent) and sulfonation reaction was carried out at 60° C. for 24 hours. The membrane was subsequently washed with water to have sulfonic acid groups in it.

TABLE 1

Characteristics of Graft Polymer Ion-Exchange Membranes

|  | Degree of grafting (%) | Ion-exchange capacity (meq/g) | Electrical conductivity $(\Omega \cdot cm)^{-1}$ | Water content (%) | Oxidation resistance | Linear swelling (%) |
|---|---|---|---|---|---|---|
| Example 1 | 18 | 0.7 | 0.08 | 16 | 98 | 98 |
| Example 2 | 38 | 0.8 | 0.09 | 22 | 97 | 103 |
| Example 3 | 26 | 0.7 | 0.09 | 21 | 98 | 98 |
| Example 4 | 48 | 1.1 | 0.09 | 28 | 99 | 104 |
| Example 5 | 23 | 0.6 | 0.08 | 19 | 98 | 99 |
| Example 6 | 56 | 1.1 | 0.12 | 26 | 98 | 105 |
| Example 7 | 78 | 2.2 | 0.14 | 68 | 91 | 99 |
| Example 8 | 17 | 0.6 | 0.06 | 22 | 95 | 103 |
| Example 9 | 22 | 0.7 | 0.07 | 25 | 94 | 108 |
| Example 10 | 36 | 0.9 | 0.10 | 27 | 95 | 113 |
| Example 11 | 27 | 0.8 | 0.09 | 24 | 98 | 99 |
| Example 12 | 73 | 2.4 | 0.12 | 98 | 81 | 129 |
| Example 13 | 66 | 2.2 | 0.10 | 51 | 93 | 98 |
| Example 14 | — | 0.6 | 0.07 | 20 | 98 | 107 |

TABLE 1-continued

Characteristics of Graft Polymer Ion-Exchange Membranes

| | Degree of grafting (%) | Ion-exchange capacity (meq/g) | Electrical conductivity $(\Omega \cdot cm)^{-1}$ | Water content (%) | Oxidation resistance | Linear swelling (%) |
|---|---|---|---|---|---|---|
| Comparative Example 1 Nafion 115[a] | — | (0.91) | (0.059) | (34) | 100 | — |
| Comparative Example 2 Nafion 117[b] | — | 0.90 (0.91) | 0.05 (0.055) | 19 (31) | 100 | 138 |
| Comparative Example 3 | 93 | 2.8 | 0.17 | 110 | 58 | 97 |
| Comparative Example 4 | 93 | 2.8 | 0.17 | 110 | 58 | 97 |

[a] Electrochimica Acta, 40, (3), 335-344 (1995)
[b] J. Electrochem. Soc., 145, 107-110 (1998)
The values in parentheses were obtained under the same conditions of measurements as in the Examples.

What is claimed is:

1. A process for producing a polymer ion-exchange membrane comprising:
    irradiating a first surface of a polymer film substrate with an ion beam selected from the group consisting of hydrogen ions, helium ions or high-energy heavy ions at $10^4 \sim 10^{14}/cm^2$ for forming holes in the substrate;
    then adding to the irradiated film substrate at least one monomer selected from monomers having a sulfonyl halide group $CF_2$=$CF(SO_2X^1)$, $CH_2$=$CF(SO_2X^1)$ and $CF_2$=$CF(OCH_2(CF_2)_{1-4}SO_2X^1)$, wherein $X^1$ is a halide group —F or —Cl;
    degassing the monomer or monomers;
    heating the film substrate so that the monomer or monomers are grafted onto the substrate;
    converting the halide group —$X^1$ in grafted molecular chains to the sulfonate group —$SO_3M$, where M is an alkali metal Na or K; and then
    converting the sulfonate group to the sulfonic acid group —$SO_3H$.

2. The process for producing a polymer ion-exchange membrane according to claim 1, wherein at least one acrylic comonomer selected from $CF_2$=$CR^2(COOR^3)$ is added for graft polymerization in an amount no more than 50 mol % of total monomer content, where $R^2$ is —$CH_3$ or —F, and $R^3$ is —H, —$CH_3$, —$C_2H_5$ or —$C(CH_3)_3$.

3. The process for producing a polymer ion-exchange membrane according to claim 2, wherein the polymer film substrate has a second surface opposite the first surface,
    wherein for the first surface irradiated with the ions, and each of the ions has a range not greater than a film thickness, and
    wherein the second surface is irradiated with a varying dose of similar or dissimilar ions having a range not greater than the film thickness, such that the two ranges will overlap in a bulk of the film.

4. The process for producing a polymer ion-exchange membrane according to claim 3, wherein the polymer film substrate is selected from polyethylene terephthalate, super-high-molecular weight polyethylene, polypropylene, polystyrene, polyamide, aromatic polyamide, polyethylene terephthalate, polyethylene naphthalate, polycarbonate, polyetherketone, polyetheretherketone, polyethersulfone, poly(phenylene sulfide) or polysulfone film substrate.

5. The process for producing a polymer ion-exchange membrane according to claim 3, wherein the polymer film substrate is selected from polyimide, polyetherimide, polyamideimide, polybenzimidazole or polyetheretherimide film substrate.

6. The process for producing a polymer ion-exchange membrane according to claim 3, wherein the polymer film substrate is selected from poly(vinylidene fluoride), ethylene-tetrafluoroethylene copolymer, polytetrafluoroethylene, tetrafluoroethylene-propylene hexafluoride copolymer or tetrafluoroethylene-per(fluoroalkyl)vinyl ether copolymer film substrate.

7. The process for producing a polymer ion-exchange membrane according to claim 1, wherein the polymer film substrate has a crosslinked structure.

8. The process according to any one of claims 1-7, wherein at least one crosslinking agent is selected from divinylbenzene, bis(vinylphenyl)ethane, triallyl cyanurate, triallyl isocyanurate, 3,5-bis(triflourovinyl)phenol or 3,5-bis(trifluorovinyloxy)phenol and the crosslinking agent is added for graft polymerization in an amount no greater than 30 mol % of total monomer content.

9. The process according to any one of claims 1-7, wherein a degree of grafting is 10-120% and an ion-exchange capacity is 0.3-2.5 meq/g.

10. The process according to any one of claims 1-7, wherein irradiating is followed by applying ionizing radiation selected from X-rays, γ-rays or electron beams.

* * * * *

UNITED STATES PATENT AND TRADEMARK OFFICE
CERTIFICATE OF CORRECTION

PATENT NO. : 8,232,353 B2  
APPLICATION NO. : 11/892304  
DATED : July 31, 2012  
INVENTOR(S) : Masaru Yoshida et al.

Page 1 of 1

It is certified that error appears in the above-identified patent and that said Letters Patent is hereby corrected as shown below:

Column 28, Line 46, In Claim 8, delete "(triflourovinyl)" and insert -- (trifluorovinyl) --, therefor.

Signed and Sealed this  
Twenty-sixth Day of February, 2013

Teresa Stanek Rea  
*Acting Director of the United States Patent and Trademark Office*